350-3.6 SR
XR 3,819,911
SEARCH ROOM
SUBSTITUTE FOR MISSING XR

United States Patent [19]
Greenaway
[11] 3,819,911
[45] June 25, 1974

[54] IDENTIFICATION CARD DECODER

[75] Inventor: David Leslie Greenaway, Bassersdorf, Switzerland
[73] Assignee: RCA Corporation, New York, N.Y.

[22] Filed: Oct. 20, 1972
[21] Appl. No.: 299,295

[52] U.S. Cl... 235/61.11 E, 340/149 A, 250/219 D, 340/146.3 P, 235/61.7 B, 235/61.12 N
[51] Int. Cl...... G06k 7/10, G06k 9/00, G06k 19/08
[58] Field of Search 340/146.3 P, 146.3 F, 146.3 Q; 235/61.7 B, 61.11 E, 61.12 N; 350/3.5; 250/219 D, 219 C, 219 R, 203

[56] References Cited

UNITED STATES PATENTS

| | | | |
|---|---|---|---|
| 3,061,730 | 10/1962 | Jankowitz | 250/203 |
| 3,239,674 | 3/1966 | Aroyan | 250/203 |
| 3,418,456 | 12/1968 | Hamisch | 235/61.11 E |
| 3,585,367 | 6/1971 | Humbarger | 235/61.11 E |
| 3,622,988 | 11/1971 | Caulfield | 340/146.3 P |
| 3,643,216 | 2/1972 | Greenaway | 340/146.3 P |
| 3,663,800 | 5/1972 | Myer | 235/61.11 E |

*Primary Examiner*—Daryl W. Cook
*Assistant Examiner*—Robert M. Kilgore
*Attorney, Agent, or Firm*—Edward J. Norton; George J. Seligsohn

[57] ABSTRACT

Cards employing a light-modifying portion containing doubly encoded numbers are responsive to the illumination thereof for deriving a binary encoded pattern of light spots lying respectively on the circumference of either of two concentric circles. By rotating the pattern about its center or by rotating the light sensing elements about an appropriate axis, solely two light sensors are required for decoding, regardless of the total number of bit positions of the code. The light-modifying portion may be a hologram.

13 Claims, 9 Drawing Figures

IDENTIFICATION CARD DECODER

Figure 1:
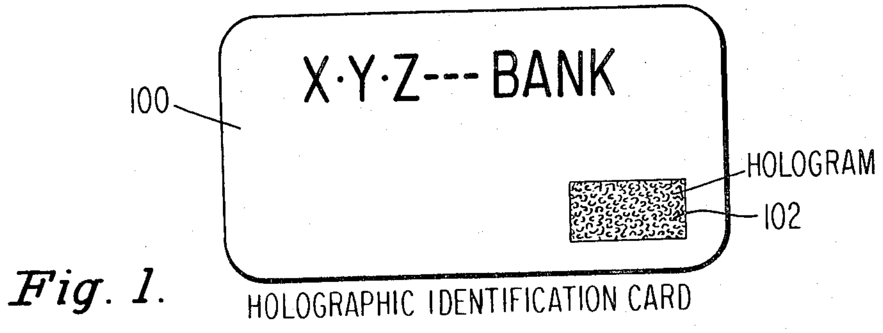

This invention relates to an improved coding technique for use with a plurality of differently encoded identification cards of a type in which each card includes an encoded light-modifying portion responsive to illumination thereof with a single readout beam of incident light for deriving a unique pattern of output light in accordance with a binary code, and, more particularly, to a decoder for this improved code.

Encoded identification cards of the type described above are, by way of example, employed in the security system disclosed in U.S. Pat. No. 3,643,216, which issued Feb. 15, 1972, and is entitled "Holographic Identification System." In the system disclosed in U.S. Pat. No. 3,643,216, the light-modifying portion of each card comprises a unique holographically encoded number which may be decoded by a simple decoder requiring only a single flashlight bulb as a light source for reconstructing an image of the holographic code. This reconstructed image comprises a fixed predetermined pattern of a total number of spaced points, some of which, in accordance with a coded number, are manifested by light spots while the rest of the points are manifested by dark spots. A matrix of spaced photocells having a separate photocell corresponding to each of the spots senses which particular spots are light spots and which particular spots are dark spots. This information from the photocell matrix is supplied to logic means which, in response thereto, derives the coded number contained in the identification card then being decoded.

Thus, the system disclosed in the U.S. Pat. No. 3,643,216 provides highly secure, tamperproof identification cards, which are doubly encoded with both holographic and cryptographic codes, but yet permit decoding thereof with a relatively simple and inexpensive decoder. The present invention is directed to an improved code which permits the cost of the already inexpensive decoder to be further reduced by a substantial amount without jeopardizing the desirable tamperproof and secure features of the identification cards.

Briefly, in accordance with the present invention, the unique pattern of output light, derived by an identification card during the decoding thereof, comprises a plurality of simultaneously-occurring separate output light beams including a first reading sequence initiation beam (abbreviated to RSI beam) and a first group composed of beams which manifest ONE bits of the binary codes thereof intersecting the circumference of a first-radius circle about an optic axis at angularly displaced positions thereof. The relative angular position on the circumference on the first-radius circle of any beam of a first group with respect to that of a first RSI beam bearing a given correspondence with an ordinal position in the code of the bit manifested thereby. The output light beams further include a second RSI beam and a second group composed of beams which manifest binary ZERO bits of the binary code intersecting the circumference of a second-radius circle about the optic axis at angularly displaced positions thereof. The relative angular position on the circumference of the second-radius circle of any beam of the second group with respect to that of the second RSI beam bears the aforesaid given correspondence with the ordinal position in the code of the bit manifested thereby. The decoder itself in the present invention includes a first light sensor situated on the circumference of the first-radius circle and a second light sensor situated in given spaced relationship with respect to the first light sensor on the circumference of the second-radius circle. Means are provided for rotating the pattern with respect to the first and second light sensors about the optic axis to thereby illuminate the first light sensor in sequence with the first RSI beam and each beam of the first group and illuminate the second light sensor in sequence with the second RSI beam and each beam of the second group. The given spaced relationship between the first and second light sensors is such that the first and second light sensors, respectively, are illuminated simultaneously by the first and second RSI beams, respectively. The decoder further includes circuit means coupled to the first and second light sensors responsive to the respective outputs therefrom during the rotation of the pattern for the determining the binary code manifested by the pattern. Thus, the decoder in the present invention eliminates the need for a photocell matrix employing a number of photocells equal to the total number of bits in the binary code, and, instead, requires only two light sensors regardless of how large the number of bits in the binary code.

Figure 2A:
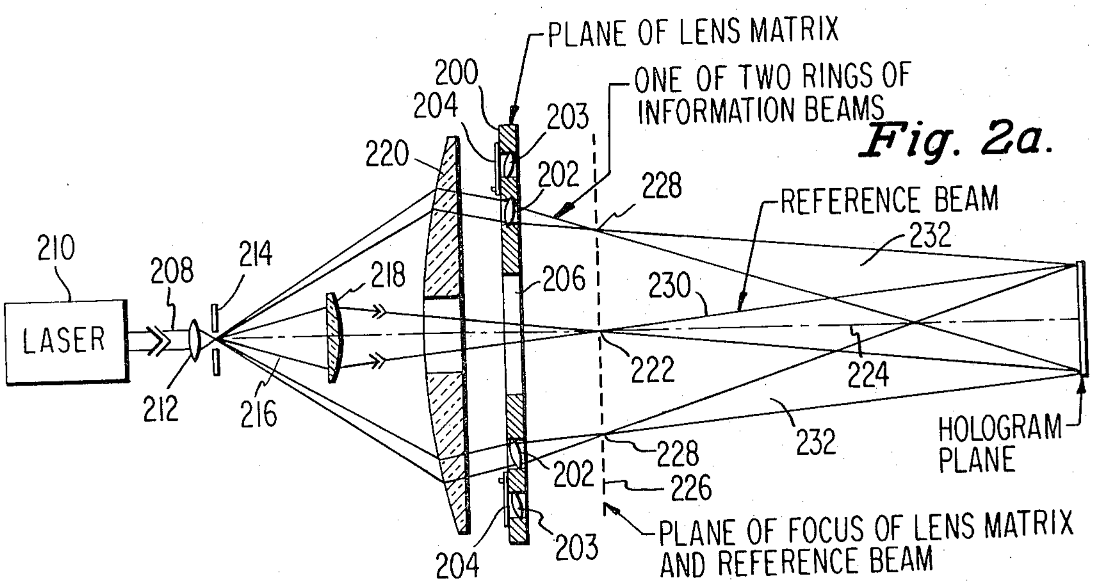
Figures 3, 4:
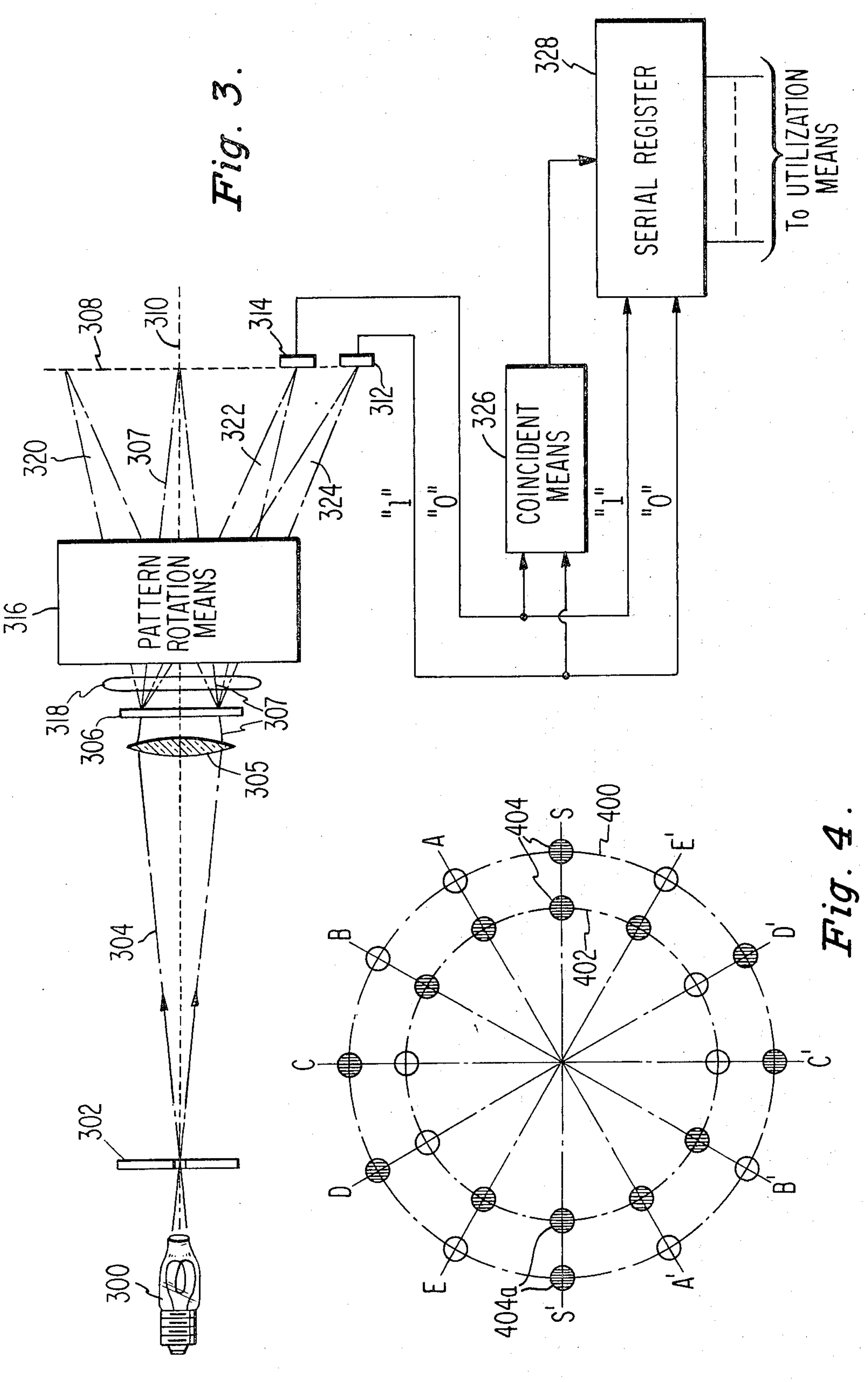

This and other features and advantages of the present invention will become more apparent from the following detailed description, taken together with the accompanying drawing, in which:

FIG. 1 illustrates a sample of a typical credit or identification card employing a holographic light-modifying portion which may be employed in the present invention;

FIGS. 2*a* and *b* are schematic diagrams of the apparatus employed in recording a hologram for use in the present invention;

FIG. 3 is a diagram of a decoding system for use in the present invention, and FIGS. 5–8 show various alternative embodiments of the pattern rotation means of FIG. 3.

The gross characteristics of the identification card shown in FIG. 1 are identical to that of the identification card shown in FIG. 1 of the aforesaid U.S. Pat. No. 3,643,216. In particular, identification card 100 may be similar to conventional identification or credit cards in size, in shape, and in including certain printed matter thereon, such as "X, Y, Z Bank," for instance. However, identification card 100 differs from a conventional identification or credit card in that it includes as an integral part thereof at some predetermined position on the card, such as near the lower right end of the card for example, a light-modifying portion, which in card 100 is hologram 102. Hologram 102 contains information in holographic form manifesting a number associated with that particular holographic identification card. Of course, different cards may have different numbers associated therewith.

The numbers associated with the identification cards of both the aforesaid U.S. Pat. No. 3,643,216 and the present invention are both cryptographically encoded, as well as holographically encoded. However, in the present invention, a somewhat different and improved cryptographic code is employed.

Figure 2B:
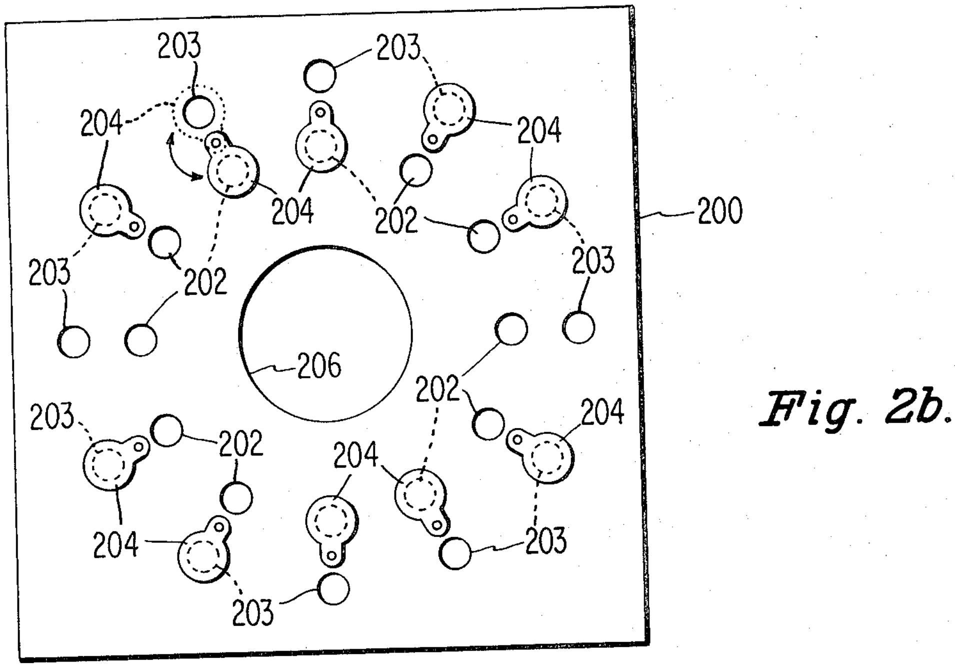

Referring now to FIGS. 2*a* and 2*b*, there is shown an embodiment of apparatus for recording a hologram manifesting in holographic form any one of a plurality of numbers that is cryptographically encoded in accordance with the cryptographic code of the present invention. In particular, otherwise opaque lens matrix 200 includes a plurality of similar convex lenses 202 and 203. The given plurality of lenses 203 are equally disposed about the circumference of a first-radius circle and an equal plurality of lenses 202 are equally disposed about the circumference of a second-radius circle which is concentric with the first-radius circle. As further shown in FIG. 2*b*, two oppositely disposed pairs of lenses 202 and 203, lying on the horizontal diameter of the two concentric circles, are all uncovered. However, each other pair of corresponding lenses 203 and 204, having the same meridional angle with respect to the horizontal, has an individual moveable opaque shutter 204 associated therewith for selectively covering either one lens or the other of the pair of lenses 202 and 203 with which it is associated.

Although for illustrative purposes the number of lenses 202 and the number of lenses 203 shown in FIG. 2*b* is only twelve, in practice many more may be employed.

Each different pair of lenses 202 and 203 lying in the upper half of FIG. 2*b* and having a shutter 204 associated therewith corresponds to a different bit position of a binary code. Further, each different pair of lenses 202 and 203 in the lower half of FIG. 2*b* corresponds with the same bit position as the diametrically opposed pair of lenses 202 and 203 in the upper half of FIG. 2*b*. Therefore, the binary code is duplicated in the upper and lower halves of FIG. 2*b*, respectively. However, this duplication is not essential to the present invention so that a lens matrix in which the different pairs of lenses 202 and 203 are confined to single half-circular portions could be substituted for the full circular portions shown in FIG. 2*b*.

The diametrically opposed horizontal pairs of uncovered lenses 202 and 203 provide a reference for the ordinal position of each bit of the binary code. By way of example, proceeding in a counter clockwise direction, the binary code manifested by the particular arrangement of shutters 204 shown in FIG. 2*b* is 00110, with uncovered lenses 202 corresponding to those bit positions having the binary value ZERO and uncovered lenses 203 corresponding to those bit positions having the binary value ONE.

In other respects, the hologram recording apparatus shown in FIG. 2*a* is somewhat similar to that employed in the aforesaid U.S. Pat. No. 3,643,216, but the optics in FIG. 2*a* have been specially chosen to provide the system with rotational symmetry and a point source Fourier geometry so that the conjugate as well as the real reconstructed images may be used as information carriers. In particular, lens matrix 200 further has a centrally located aperture 206 therethrough. A beam of coherent light 208 from laser 210 is passed through lens 212 and pin hole 214 to form divergent beam 216. Central portion of beam 216, after passing through relatively small aperture condensing lens 218 and the central aperture of relatively large aperture condensing lens 220, passes through aperture 206 in lens matrix 200 to focus at point 222, which is situated at the intersection of optic axis 224 and a plane 226 normal to optic axis 224. The outer portions of beam 216 miss small aperture condensing lens 218, but pass through large aperture condensing lens 220 and then are incident on lens matrix 200. Since lens matrix 200 is opaque except for the uncovered ones of lenses 202 and 203, only light incident on the uncovered ones of lenses 202 and 203 will pass beyond matrix 200. The focal length of lenses 218, 220 and each of lenses 202 and 203 are so selected that each beam of light emerging from an uncovered one of lenses 202 or 203 focuses to a separate point 228 lying in the same plane 226 as does point 222 on optic axis 224. Point 222 constitutes a point source for reference beam 230, while each separate point 228 constitutes a point source of individual information beams 232 corresponding respectively to each of the uncovered ones of lenses 202 and 203. Thus, points 228 lie either on the circumference of a first-radius circle or the circumference of a second-radius circle, both of which are centered at point 222. Exposure of hologram recording medium 234 simultaneously by reference beam 230 and all of information beams 232 results in a hologram of the pattern formed by points 228 in plane 226.

Referring now to FIG. 3, there is shown an embodiment of a simple, inexpensive decoder which may be employed for decoding the number associated with each of a plurality of different identification cards which include respective holograms thereon that have been recorded by the arrangement shown in FIGS. 2*a* and 2*b*. The decoder shown in FIG. 3 comprises a light source 300, which may be a polychromatic noncoherent light wave such as may be obtained from a conventional flashlight lamp bulb having an integral focusing lens, as shown, or other compact tungsten filament lamp, incoherent light emitting diode, used in conjunction with simple focusing optics. Also a lasing diode may be employed. It is preferable to provide some coarse wavelength and spatial filtering for broad polychromatic sources if required in order to avoid image overlap. The light from light source 300 is passed through a beam limiting aperture 302 through which a convergent readout beam of polychromatic noncoherent light 304 emerges. Beam 304 is incident on focusing lens 305. Lens 305 produces a converging beam of light 307 incident on hologram 306 of the identification card then being read out. The convergence of readout beam 307 is related to the divergence of the reference beam 230, discussed above, utilized in recording the hologram in a manner such as to produce a real reconstructed image of a pattern corresponding to the uncovered ones of lenses 202 and 203 which existed at the time of the recording of hologram 306. The focus of beam 307 lies on the image plane 308 and on the optic axis 310 of the system.

Each of the uncovered lenses will be represented in a reconstructed image lying in image plane 308. Each uncovered lens will be represented in plane 308 as a radially dispersed spectrum having an extent determined by the amount of wavelength and spatial filtering provided by the optical system used for readout. For the purposes of this invention, each uncovered lens can be taken to yield a reconstructed spot of light in the image plane 308. Furthermore, because of the arrangement in recording the hologram of lenses 202 on the circumference of a first-radius circle and lenses 203 on the circumference of a second-radius circle, the relative positions of the reconstructed spots of light in image plane 308 will also lie on this circumference of a first-radius circle or the circumference of a second-radius circle which is concentric therewith, as shown in FIG. 4. The center of both the first-radius circle and the second-radius circle lies on optic axis 310.

The present invention requires only two light sensors regardless of the size of the total number of light spots to be detected. In particular, a first light sensor 312 lies on the circumference of the relatively larger first-radius circle 400 in image plane 308 and a second light sensor 314 lies on the circumference of the relatively smaller second-radius circle 402 in image plane 308.

In order that all of the light spots may be detected by either first light sensor 312 or second light sensor 314, the pattern of light spots is rotated in plane 308 with respect to light sensors 312 and 314. This can be accomplished by either rotating identification card 306 about optic axis 310 with light sensors 312 and 314 being maintained stationary or rotating light sensors 312 and 314 about optic axis 310 with identification card 306 being maintained stationary. Alternatively, rotation of the pattern of light spots in image plane 308 with respect to light sensors 312 and 314 may be obtained by employing separate pattern rotation means 316 which is illuminated by a non-rotating pattern of output light 318 emerging from identification card 306. Means 316 transforms this non-rotating output light into a rotating pattern of light comprising the plurality of output beams of light such as output beams 320, 322 and 324 imaged into the aforesaid pattern of light spots lying on the circumference of either first-radius circle 400 or second-radius circle 402.

Figure 5:
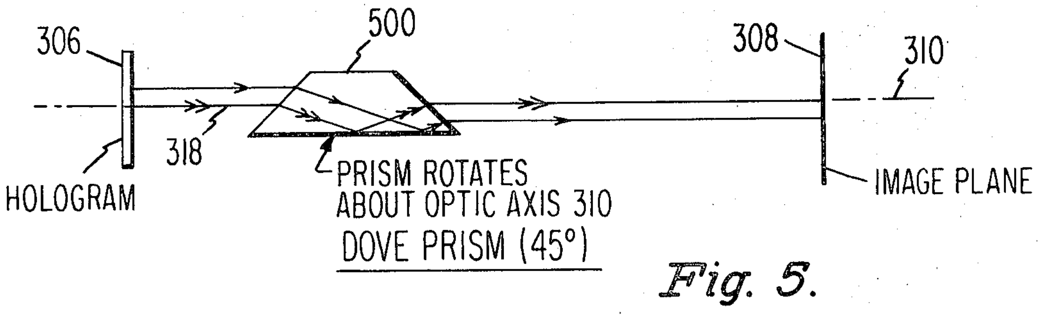
Figure 6:
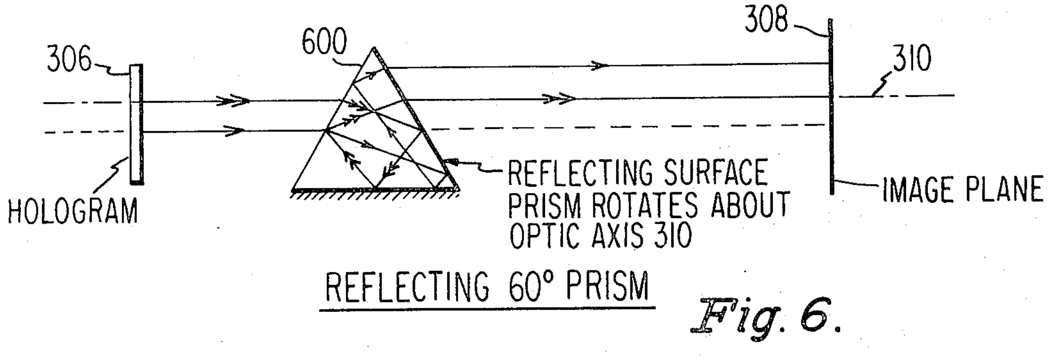
Figure 7:
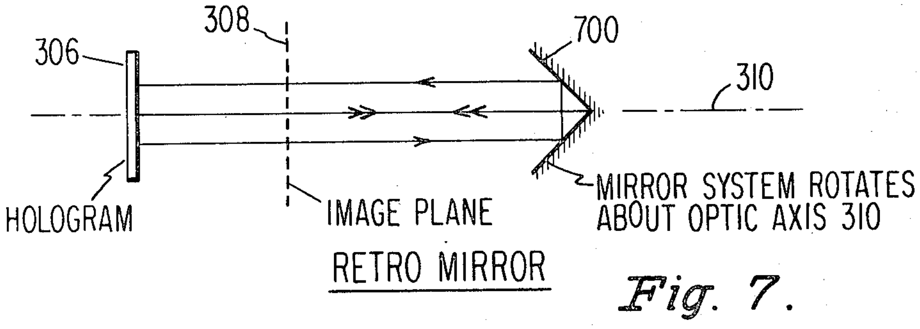
Figure 8:
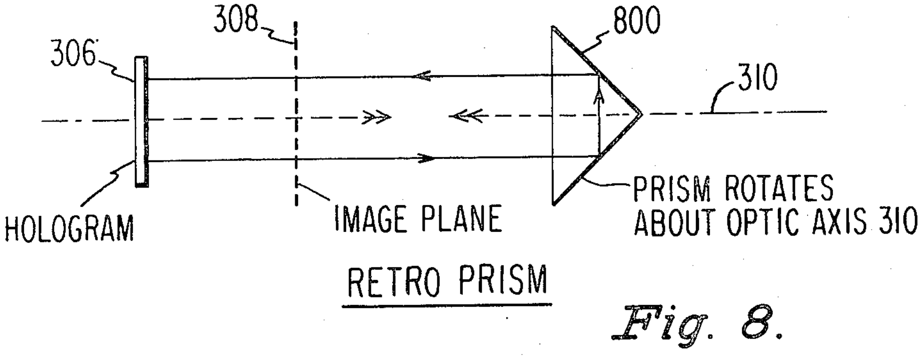

Examples of various structures that pattern rotation means 316 may take are shown in each of FIGS. 5–8. In particular, FIG. 5 shows a 45° Dove prism 500 which is situated between hologram 306 and image plane 308 and which is rotated about optic axis 310 by suitable means not shown. In FIG. 6, the reflecting 60° prism 600 situated between hologram 306 and image plane 308 is rotated about optic axis 310 by suitable means not shown. In FIG. 7, retromirror 700, which includes two mirrors with a 90° included angle with the mirrors planes at 45° to optic axis 310, is rotated about optic axis 310 by suitable means not shown and reflects the output light from hologram 306 back to image plane 308. In FIG. 8, retroprism 800, which is a 90° prism with its hypotenuse oriented at a 90° angle to optic axis 310, is rotated about optic axis 310 by suitable means not shown and reflects back the output light from hologram 306 to image plane 308. In each of FIGS. 5–8, the pattern rotates in image plane 308 at twice the angularly velocity of the rotating element 500, 600, 700 or 800, as the case may be. It is assumed in all cases that the motor force for rotation is provided by either an electric motor or by mechanical means.

Returning to FIG. 3, light sensor 312 is electrically connected at a first input to coincidence means 326 and is a first input to initially disabled serial register 328. Light sensor 314 is electrically connected as a second input to coincidence means 326 and as a second input to serial register 328. The output from coincidence means 326 is applied as a start input to serial register 328 to initiate the operation thereof. The output from serial register 328 is applied to utilization means, not shown, which may include a digital comparator, digital register, data processer, indicator, and/or watching mechanism for a lock, as is discussed in more detail in the aforesaid U.S. Pat. No. 3,643,216.

As the pattern shown in FIG. 4 rotates, each light spot on first-radius circle 400 will in turn illuminate first light sensor 312 and each light spot on second radius circle 402 will in turn illuminate second light sensor 314. Serial register 328 will remain disabled until a start signal is applied thereto from coincidence means 326. This occurs only in response to first input from first light sensor and a second input from second light input 314 being simultaneously applied to coincidence means 326; i.e., only when either pair of RSI light spots 404 or **404*a* illuminates first and second light sensors 312 and 314 simultaneously. Once enabled, serial register 328 registers the binary value of each successive ordinal bit position of the binary number assigned to the card then being decoded to thereby register the binary number associated with the card then being decoded and apply it to utilization means not shown. The light pattern depicted in FIG. 4, by way of example, represents the binary number 00110, assuming rotation of the pattern in the counterclockwise direction. FIG. 4** depicts both pairs of RSI light-spots on a common diameter. It is implicit in this description that one circle of light spot positions may be rotated with respect to the other circle by any desired angle provided this rotation is taken into account when the holograms are recorded, and included in the read-out geometry by transposing the two image sensors so that they make the desired angle with respect to the optic axis, in the image plane.

In the embodiment of the invention described above and shown in the drawings, the light-modifying portion of each identification card is in the form of a hologram. However, it is not essential to the present invention that the light-modifying portion of an identification card be limited to a hologram. All that is essential is that the light-modifying portion of an identification card when illuminated by a single readout beam of incident light derive a unique pattern of output light in accordance with a binary code manifested by the light-modifying portion which has the format shown in FIG. 4. For instance, the copending patent application Ser. No. 299,294, filed Oct. 20, 1972 by Greenaway et al, and assigned to the same assignee as the present invention, teaches a light-modifying portion which includes a plurality of discrete subareas each of which is occupied by an assigned one of a group of different predetermined light-modifying form, such as prisms, each of which when illuminated derives an individual output light beam at an inclination angle which is determined by the assigned form occupying that subarea. Further, each form may occupy an assigned one of a second group of predetermined meridional angles. By assigning meridional angles in accordance with the bit position of a binary code and assigning inclination angles with the binary value of each bit position, such a light-modifying portion is capable of forming the patterns shown in FIG. 4 when illuminated with a single incident light beam. It is intended that the appended claims cover this latter-described light-modifying portion, as well as a light-modifying portion comprising a hologram.

In the case where the light-modifying portion of an identification card does comprise a hologram, and the hologram is made and reconstructed using the principles described above, translational invariance will be achieved due to the Fourier transform nature of the recording, and rotational invariance will be achieved due to the employment of image rotation means in the decoder operation. Further, the redundant nature of the recording ensures that the hologram coding cannot readily be altered, and is unaffected by small scale defects and environmental damage.

What is claimed is:

1. In a security system comprising at least one decoder for a plurality of differently encoded identification cards of a type in which each card includes an encoded light-modifying portion responsive to illumination thereof with a single readout beam of incident light for deriving a unique pattern of output light in accordance with a binary code manifested by the light-modifying portion of that card then being illuminated:

a. wherein each of said unique patterns comprises a plurality of simultaneously-occurring separate output light beams including a first reading sequence initiation beam and a first group composed of beams which manifest ONE bits of said binary code intersecting the circumference of a first-radius circle about an optic axis at angularly displaced positions thereof; the relative angular position on said circumference of said first-radius circle of any beam of said first group with respect to that of said first reading sequence initiation beam bearing a given correspondence with the ordinal position in said code of the bit manifested thereby; said output light beams further including a second reading sequence initiation beam and a second group composed of beams which manifest binary ZERO bits of said binary code intersecting the circumference of a second-radius circle about said optic axis at angularly displaced positions thereof, the relative angular position on said circumference of said second radius circle of any beam of said second group with respect to that of said second reading sequence initiation beam bearing said given correspondence with the ordinal position in said code of the bit manifested thereby, and b. wherein said decoder includes a first light sensor situated on the circumference of said first-radius circle and a second light sensor situated in given spaced relationship with respect to said first light sensor on the circumference of said second-radius circle; means for rotating said pattern with respect to said first and second light sensors about said optic axis to thereby illuminate said first light sensor in sequence with said first reading sequence initiation beam and each beam of said first group and illuminate said second light sensor in sequence with said second reading sequence initiation beam and each beam of said second group, said given spaced relationship between said first and second light sensors being such that said first and second light sensors, respectively, are illuminated simultaneously by said first and second reading sequence initiation beams, respectively, and circuit means coupled to said first and second light sensors and responsive to the respective outputs therefrom during said rotation of said pattern for determining the binary code manifested by said pattern.

2. The system defined in claim 1, wherein said encoded light-modifying portion of each card is a hologram.

3. The system defined in claim 1, wherein said predetermined plural number of bits is greater than two, and the total number of light sensors included in said decoder is solely said first and second light sensors.

4. The system defined in claim 1, wherein said first and second light sensors are aligned along a common radius of said first and second circles.

5. The system defined in claim 1, wherein said circuit means includes initially disabled register means and coincidence means, said register means being effective only when operation for serially registering in order the sequence of the respective beams of said first and second groups illuminating said first and second light sensors, and said coincidence means being responsive to the simultaneous illumination of both said first and second light sensors by said first and second reading sequence initiation beams for applying an enabling signal to said counting means to initiate operation of said counting means.

6. The system defined in claim 1, wherein the position of an identification card then being decoded is substantially fixed with respect to said light sensors, and wherein said means for rotating said pattern includes optical means illuminated with said pattern and rotated with respect to said light sensors about said optical axis.

7. The system defined in claim 6, wherein said optical means comprises a 45° Dove prism.

8. The system defined in claim 6, wherein said optical means comprises a reflecting 60° prism having one face thereof oriented substantially parallel to said optical axis.

9. The system defined in claim 6, wherein said optical means comprises a retro-mirror including two contiguous plane mirrors each oriented at a 90° included angle with respect to the other hand and at a 45° angle with respect to said optical axis.

10. The system defined in claim 6, wherein said optical means comprises a retro-prism including a 90° prism oriented with its hypotenuse substantially normal to said optic axis.

11. The system defined in claim 1, wherein the identification card is rotated with respect to said light sensors, and said light sensors are substantially fixed.

12. The system defined in claim 1, wherein the said light sensors rotate together about the said optic axis, and the identification card being decoded is substantially fixed.

13. The system defined in claim 1, wherein said first-radius circle and said second-radius circle are concentric and said first and second radii are different from each other.

* * * * *